US012674728B2

(12) United States Patent
Kärki et al.

(10) Patent No.: US 12,674,728 B2
(45) Date of Patent: Jul. 7, 2026

(54) FILTRATE SAMPLING DEVICE

(71) Applicant: VALMET AUTOMATION OY, Espoo (FI)

(72) Inventors: Pasi Kärki, Kajaani (FI); Jesse Jansa, Ristijärvi (FI)

(73) Assignee: VALMET AUTOMATION OY, Espoo (FI)

( * ) Notice: Subject to any disclaimer, the term of this patent is extended or adjusted under 35 U.S.C. 154(b) by 255 days.

(21) Appl. No.: 18/588,141

(22) Filed: Feb. 27, 2024

(65) Prior Publication Data

US 2024/0288341 A1     Aug. 29, 2024

(30) Foreign Application Priority Data

Feb. 27, 2023     (FI) ..................................... 20237038

(51) Int. Cl.
*G01N 1/14* (2006.01)

(52) U.S. Cl.
CPC ....... *G01N 1/14* (2013.01); *G01N 2001/1454* (2013.01)

(58) Field of Classification Search
CPC ............. G01N 1/14; G01N 2001/1454; G01N 1/2035; G01N 1/34; G01N 2001/1427; G01N 1/02; G01N 1/10; G01N 1/28; G01N 2001/002; G01N 1/20; G01N 2001/1025; G01N 2001/1062; B01D 29/03; B01D 29/64; B01D 29/6484; B01D 29/15
See application file for complete search history.

(56) References Cited

U.S. PATENT DOCUMENTS

| | | | | |
|---|---|---|---|---|
| 4,635,470 A | * | 1/1987 | Skallen | G01N 1/2035 |
| | | | | 162/263 |
| 5,625,157 A | | 4/1997 | Piirainen et al. | |
| 6,463,816 B1 | * | 10/2002 | Skaalen | G01N 1/20 |
| | | | | 73/863.24 |
| 6,520,343 B2 | | 2/2003 | Karlsson et al. | |
| 2020/0150010 A1 | | 5/2020 | Mlambo et al. | |

FOREIGN PATENT DOCUMENTS

| | | | | |
|---|---|---|---|---|
| CN | 109030104 A | * | 12/2018 | ............... G01N 1/14 |
| EP | 0 724 145 A2 | | 7/1996 | |
| FI | 57663 C | | 9/1980 | |
| FI | 20225065 A1 | | 7/2023 | |
| WO | 00/05562 A1 | | 2/2000 | |
| WO | 03/046518 A1 | | 6/2003 | |

OTHER PUBLICATIONS

CN-109030104-A (Year: 2018).*
Oct. 31, 2024 Office Action issued in Finnish Patent Application No. 20237038.
Sep. 17, 2024 Office Action issued in Swedish Patent Application No. 2450231-2.
Sep. 26, 2023 Office Action issued in Finnish Patent Application No. 20237038.
Sep. 26, 2023 Search Report issued in Finnish Patent Application No. 20237038.

* cited by examiner

*Primary Examiner* — Fatemeh Esfandiari Nia
(74) *Attorney, Agent, or Firm* — Oliff PLC

(57) ABSTRACT

A novel filtrate sampling device for collecting a filtrate sample from a pulp solution. The filtrate sampling device includes: a jacket, a piston rod including a first end and second end, the piston rod being arranged inside the said jacket in the longitudinal direction of the jacket, and a hole screen arranged on the piston rod. The hole screen includes a number of holes in the piston rod.

5 Claims, 3 Drawing Sheets

FILTRATE SAMPLING DEVICE

TECHNICAL FIELD

The present invention relates to filtrate sampling devices. The invention is especially related to a filtrate sampling device for collecting a filtrate sample from pulp solution.

BACKGROUND

Filtrate sampling devices are used in pulp, paper and board industries for taking filtrate samples from pulp solution. From the filtrate sample, chemical properties of the filtrate can be determined, such as pH, peroxide concentration or residual matter concentration. It is important to determine the pH of the filtrate sample, as pH determines the reaction rate of chemicals introduced into the process. Each bleaching step has a specific optimal pH, in which chemicals have the best effect. Additionally, pH has an effect on precipitation formed in tubes and other devices. When pH can be measured and controlled, production stops caused by precipitation can be reduced and the total cost of pulp bleaching can be reduced.

Despite the high process temperature and pressure, it must be safe to take sample of filtrate. In addition, the filtrate sampling device must be capable of being installed in a place where the sample will be representative. The temperature of the filtrate in the measurement point must correspond with the process temperature as closely as possible. The mechanical construction of the sampling device must ensure uninterrupted sampling for year after year.

Taking a representative sample can be difficult with generally used filtrate sampling devices. In addition, the filtrate sampling device can be clogged by fibres and extract, whereby the filtrate sampling device must be removed from the process for cleaning. Thus has arisen a need for further development of filtrate sampling devices. Patent application FI 20225065 describes a filtrate sampler with piston rod directional slits. Patent application WO 00/05562 describes filtrate sampler with filter formed by wire. Patent application FI 780776 describes a removable filter sampler. Patent application EP 0724145 describes filtrate sampler with incorporated measuring sensor. U.S. Pat. No. 5,625,157 describer a filtrate sampler with a sampling duct between piston and cylinder walls.

SUMMARY

The object of the present invention is to provide an apparatus by means of which a representative filtrate sample can be extracted from the pulp solution and that stays clean during operation.

BRIEF DESCRIPTION OF DRAWINGS

In the following, some embodiments of the invention are disclosed in more detail by means of reference to the appended drawings, in which.

EMBODIMENTS

Figures 1, 2, 3:
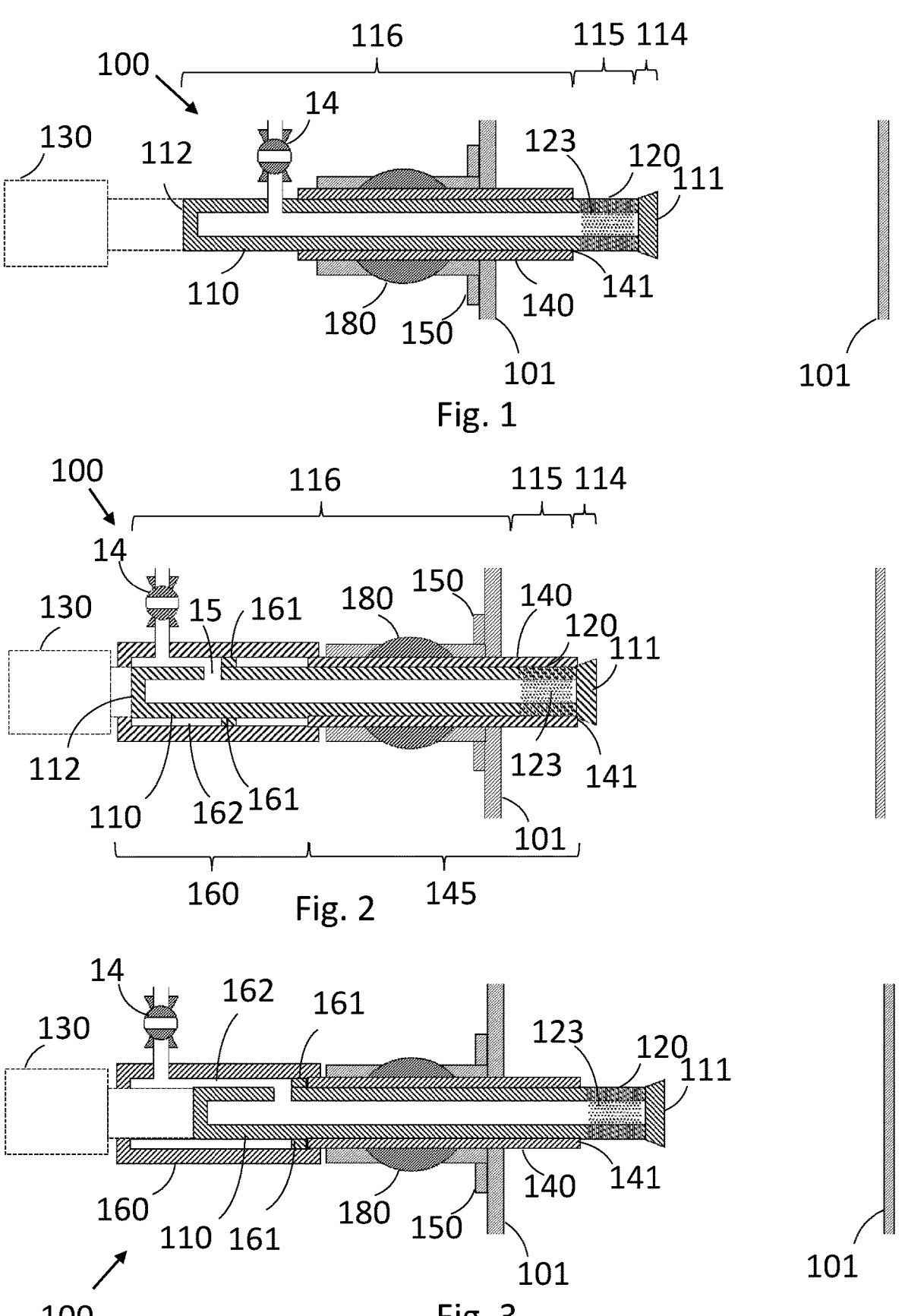
FIG. 1 shows a filtrate sampling device.
FIG. 2 shows a filtrate sampling device with backflush equipment.
FIG. 3 shows a filtrate sampling device with backflush equipment.

In this context the term "longitudinal direction of the piston rod" means the direction in which the piston rod is arranged to reciprocate.

In this context the term "longitudinal direction of the jacket" means the direction that is essentially the same as the longitudinal direction of the piston rod.

In this context the term "fibre-free sample" means an essentially fibre-free sample that can, however, comprise single fibres or parts of fibres.

Taking a representative sample can be difficult with generally used sampling devices. Additionally, the sampling device can be clogged by fibres and extract, whereby it must be removed from the process for cleaning. The embodiments disclosed in the following are meant to solve at least some of the above-mentioned problems.

According to one embodiment the filtrate sampling device 100 for collecting a filtrate sample from the pulp solution comprises a jacket 140, a piston rod 110 comprising a first end 111 and a second end 112, the piston rod 110 being arranged inside the said jacket 140 in the longitudinal direction of the jacket 140, and a hole screen 120 arranged on the piston rod 110. The hole screen 120 comprises a number of holes 123 arranged in the piston rod 110. As the piston rod moves into the pulp solution, a fibre layer is formed over the hole screen and partly in the holes of the hole screen, preventing the fibres from entering the hole screen through the holes of the hole screen. Instead, the filtrate penetrates the fibre layer. Thus, the filtrate sampling device enables reliable determination of chemical properties of the filtrate, such as pH, due to the good flow of filtrate and fibre-free filtrate. The said fibre layer acts as a "brush", when the hole screen is removed from the process. Thereby the fibre layer accumulated over the piston rod is removed and simultaneously the piston is cleaned. Thus, the need to clean the filtrate sampling device and the amount of production stops caused by it are reduced.

The piston rod 110 is arranged to reciprocate inside the jacket 140 in the longitudinal direction of the jacket. The end edge of the jacket 140 is arranged to clean the hole screen 120 as the piston rod 110 moves into the jacket 140. The end edge 141 of the jacket 140 refers to the end at the side of the hole screen 120 in the longitudinal direction of the jacket. The end edge 141 of the jacket 140 is the edge of the jacket on the side of which the hole screen 120 at least partly penetrates into the jacket 140. The shape of the cross section of the end edge of the jacket 140 is the same as the cross-section of the hole screen 120. Additionally, the shape of the cross section of the piston rod 110 can be same as the cross-section of the hole screen 120. Preferably the cross-section of the hole screen 120 and/or the piston rod 110 is a circle or circular. There is a narrow clearance between the jacket 140 and the hole screen. The narrow clearance allows the penetration of the hole screen at least partly into the jacket. The clearance can be, for example, from 0.03 to 0.17 mm, preferably from 0.07 to 0.13 mm. Thus, when the hole screen is removed from the process at least partly inside the jacket, the fibre layer contacts the end edge 141 of the jacket as the hole screen moves back into the jacket. Thereby the fibre layer accumulated on the hole screen is loosened and the outer surface of the hole screen is cleaned.

The filtrate sampling device 100 can additionally comprise an actuator 130. The actuator 130 can be connected to the second end 112 of the piston rod 110. The actuator 130 can be arranged to reciprocate the piston rod 110 in the longitudinal direction of the piston rod 110 inside the jacket 140.

The filtrate sampling device 100 can also comprise a flange 150 for fastening the filtrate sampling device 100 into its place. The filtrate sampling device can be solidly and reliably fastened to e.g. process line or tank by means of the flange 150. Thus, the filtrate sampling device can be reliably fastened to a place where it is possible to collect a representative filtrate sample.

The diameter of the piston rod 110 can be, for example, 8 to 80 mm. Preferably the diameter of the piston rod 110 is 10 to 50 mm. The piston rod is hollow, and the thickness of the walls of the piston rod are 0.7 to 3.5 mm.

The hole screen 120 can be formed at the first end 111 of the piston rod 110. Thus, the hole screen portion can begin from the first end 111 of the piston rod 110 and extend a pre-determined distance towards the second end 112 of the piston rod 110.

The length of the hole screen 120 portion can be, for example 10 to 100 mm. Preferably the length of the hole screen 120 portion is 20 to 80 mm.

Alternatively, the hole screen 120 can be formed at a distance from the first end 111 of the piston rod. Thus, the first end 111 of the piston rod 110 can be provided with a first section 114 with no holes. The first section 114 can be connected to the second section 115. The second section 115 comprise a number of holes 123 extending in the piston rod 110. Thus, the second section 115 forms the hole screen 120. The second section 115 is connected to a third section 116. The third section 116 is a section of the piston rod 110 with no holes. The holes may be equally spread within the length of the hole screen 120. The density of holes in the hole screen 120 may also vary. There can be more holes closer to the first end 111 of the piston rod than to the second end 112. This way the flow through the hole filter is more balanced while moving the piston rod 110.

The second section 115 can begin, for example, 3 to 30 mm from the first end 111 of the piston rod 110.

The diameter of the first section 114 can be as large as or larger than the diameter of the second section 115. The diameter of the first section 114 can be, for example, from 2 to 5 mm, larger than the diameter of the second section 115. Thus, the first section 114 of the piston rod forms a plug at the end of the jacket 140, when the piston rod 110 is pulled away from the process.

The piston rod 110 is hollow. Thereby the piston rod is tube-like and provided with a free interior space for receiving the filtrate sample. Thus, the filtrate can flow from the hole 123 of the hole screen 120 into the piston rod 110 and from there further on to be analysed. The said unit formed by the piston rod and hole screen is simple and easy to manufacture.

The filtrate sampling device 100 can additionally comprise a ball valve 180. The ball valve 180 can be attached to the flange and the jacket 140 is put through the ball valve. The ball valve enables closing the flow path of the pulp solution when the filtrate sampling device is removed from the sample conduit for maintenance. Thus, the pulp solution is not allowed to flow away from the process tube or tank when the filtrate sampling device is removed.

The jacket 140 is straight tubular form that enables smooth movement for the piston rod 110. Ideally the jacket is made as one-piece tubular form without joints. The jacket 140 can be moved to different depths within the pipe or container providing thus possibility to take the sample either closer to the pipe or container wall or from deeper position. The jacket can be fixed to desired position with tension sleeve. There can be additional washers between the piston rod 110 and the jacket 140 to prevent process liquid flowing between the piston rod and the jacket.

FIG. 1 shows the filtrate sampling device 100 wherein the hole screen 120 is formed in the piston rod 110. The piston rod 110 has been pushed into pipes 101 pulp solution to collect a filtrate sample. The actuator 130 is connected to the second end 112 of the piston rod 110 for reciprocating the piston rod 110 in the longitudinal direction of the piston rod. The filtrate sampling device 100 is fastened to the measuring point by means of flange 150. The filtrate sampling device 100 comprises a hollow piston rod 110. The piston rod 110 is arranged inside the jacket 140, the jacket 140 extending to the pulp solution. The piston rod 110 comprises the first section 114 seen from the first end of the piston rod 111, the second section 115 connected to the first section 114 and the third section 116 connected to the second section 115. The second section 115 comprises a plurality of holes 123. Thus, the second section 115 forms the hole screen 120. The filtrate sampling device 100 comprises a ball valve 180 providing closable path to the process pipe 101. A branch or valve 14 has been formed in the third section of the piston rod 110 through which the filtrate sample can be collected.

FIG. 2 shows an embodiment of the invention where the filtrate sampling device is added with backflush equipment. The filtrate sampling device 100 wherein the hole screen 120 is formed in the piston rod 110. The piston rod 110 has been pulled from the pulp solution. The actuator 130 is connected to the second end 112 of the piston rod 110 for reciprocating the piston rod 110 in the longitudinal direction of the piston rod. The filtrate sampling device 100 is fastened to the measuring point by means of flange 150. The filtrate sampling device 100 comprises a hollow piston rod 110. The piston rod 110 is arranged inside the jacket 140, the jacket 140 extending to the pulp solution. The piston rod 110 comprises the first section 114 seen from the first end of the piston rod 111, the second section 115 connected to the first section 114 and the third section 116 connected to the second section 115. The second section 115 comprises a number of holes 123. Thus, the second section 115 forms the hole screen 120. The filtrate sampling device 100 comprises a ball valve 180 providing closable path to the process pipe. There is an opening 15 in the third section 116 of the piston rod providing path to a branch or valve 14 through which the filtrate sample can be collected. The jacket 140 comprises of two portions 145, 160 that have different diameter. The portion that is on the second end of the piston rod 112 has larger diameter than the portion that is in the first end of the piston rod 111. The length of the portion with smaller diameter 145 that is on the first end of the piston rod 111 is 300 to 1000 mm. The length of the portion with larger diameter 160 is 150 to 600 mm. The inner diameter of the portion with larger diameter 160 is 18 to 140 mm. The portion with larger diameter 160 has an empty space 162 between the inner wall of the jacket 140 and the piston rod 110. There is a circular protrusion 161 around the piston rod. The circular protrusion locates in the piston rod closer to the second end of the piston rod 112 than to the first end of the piston rod 111. The opening 15 in the piston rod 110 is located between the circular protrusion and the second end 112 of the piston rod providing path to the empty space 162. The circular protrusion can be 5 to 30 mm tall and extends 5 to 30 mm along the piston rod. The gap between the inner wall of the jacket 140 and the circular protrusion 161 is minimal still allowing the movement of the piston rod and there can be a washer attached to the circular protrusion to provide hermetic sealing between both sides of the circular protrusion. The circular protrusion 161 is effectively creating a piston affecting the volume of the empty space 162. When the piston rod 110 moves outward from the jacket, the volume of the empty space 162 increases and when the piston rod moves inward to the jacket the volume of the empty space 162 decreases. The backflush equipment comprise at least the portion of a jacket 140 in the second end of the piston rod 112 having larger diameter than the portion of the jacket in the first end of the piston rod 111 and circular protrusion 161 around the piston rod 110 effectively creating a piston within the jacket portion with larger diameter 160. In the FIG. 2 the empty space 162 between the inner wall of the jacket 140 and the piston rod 110 is in its minimal volume.

FIG. 3 shows the previous embodiment of the invention where the filtrate sampling device is added with backflush equipment. The piston rod 110 has been pushed into the pulp solution. The empty space 162 between the inner wall of the jacket 140 and the piston rod 110 is in its maximal volume.

Figures 4A, 4B, 4C, 4D:
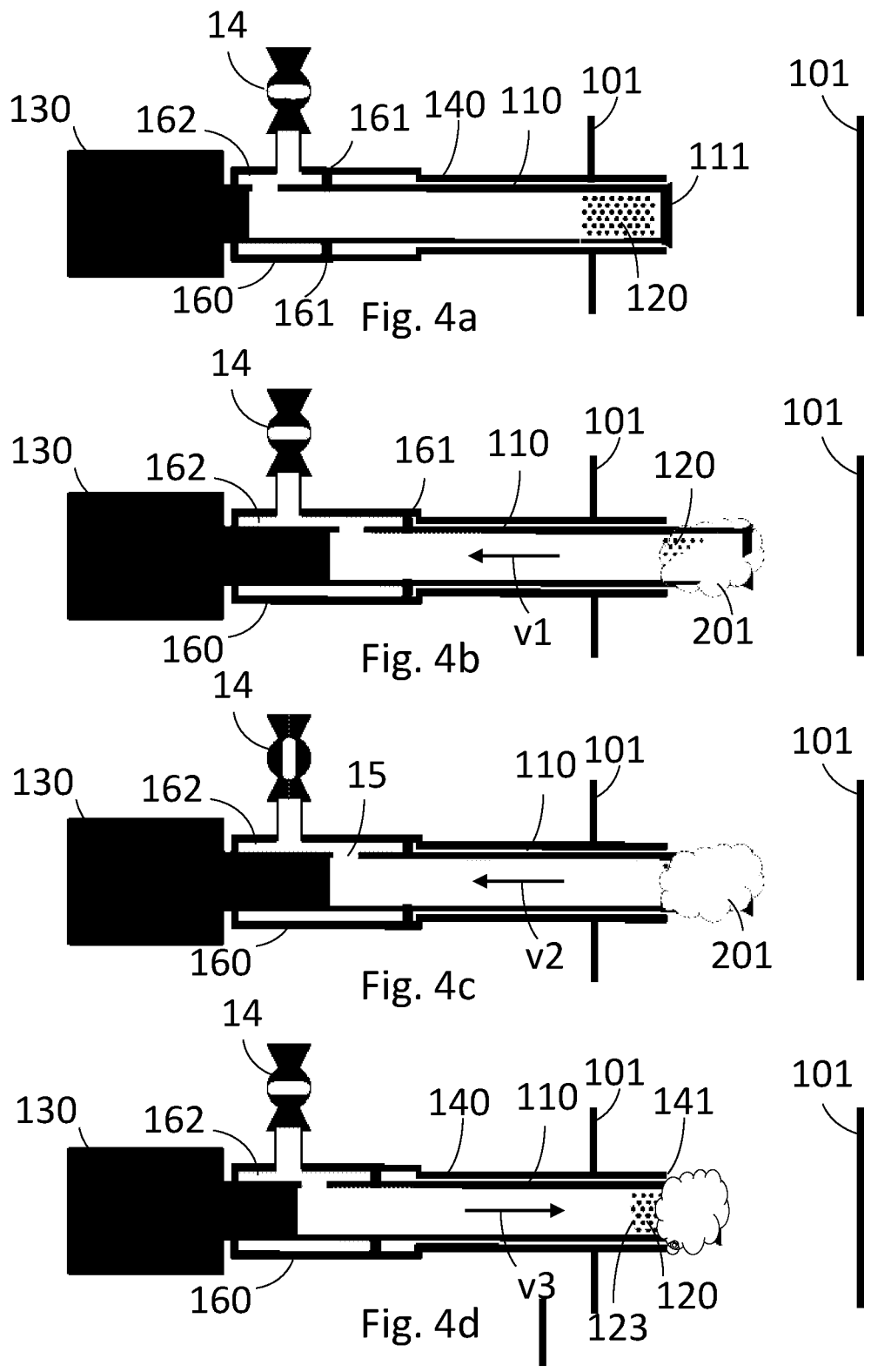
FIGS. 4a-4d show a filtrate sampling sequence with a filtrate sampling device.

FIGS. 4a-4d show a filtrate sampling sequence with a filtrate sampling device according to an embodiment of the invention. In FIG. 4a the filtrate sampler is installed to a pipe 101 so that the piston rod's 110 first end can reach the process liquid. Filtrate sampling process begins with having the hole screen 120 withdrawn from the process liquid. Valve 14 is closed. The empty space 162 between the inner wall of the jacket 140 and the piston rod 110 is in its minimal volume. No flow occurs through the hole screen 120. In FIG. 4b the actuator 130 pushes slowly the piston rod 110 and the hole screen 120 gets in touch with the process liquid. The circular protrusion 161 moves along with the piston rod and the volume of the empty space 162 increases. The flow v1 of process liquid comes through the hole screen and hollow piston rod filling the enlarging empty space 162. Simultaneously a fibre layer 201 is forming on top of the hole screen. It is beneficial to move the piston rod slowly to get only minimal flow v1 so that the fibre layer may form well and minimal amount of fibres flow through the hole screen 120. This phase ends when the hole screen is extracted and the volume of the empty space 162 has reached maximum value. In FIG. 4c the fibre layer 201 covers fully the hole screen 120. The valve 14 is opened and the actual filtrate sample flow v2 is enabled. Now the filtrate sample flows through the fibre layer 201, hole screen 120, piston rod 110, opening 15, empty space 162 and valve 14. When desired amount of filtrate sample is collected, the valve 14 is closed. In FIG. 4d the valve 14 is closed and the piston rod is being retracted by the actuator 130 from the suspension. The end edge 141 brushes the hole screen with the fibre layer as the hole screen moves into the jacket 140. Simultaneously the volume of the empty space 162 between the inner wall of the jacket 140 and the piston rod 110 decreases and the liquid that has been there is backflushing v3 through the piston rod 110 and through the holes in the hole screen 120. This flow pushes the fibres out from the holes 123 of the hole screen. Once this phase ends the hole screen is clean and fully retracted from the suspension.

Figure 5:
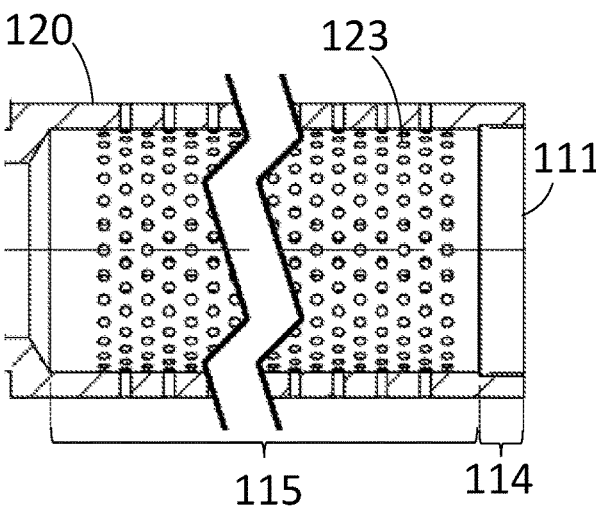
FIG. 5 shows a hole screen with round holes.

In FIG. 5 there is an embodiment of hole screen 120 with round holes. The holes 123 are set to a symmetrical pattern. The diameter of the holes 123 of the hole screen 120 is 0.05 to 0.6 mm, preferably 0.1 to 0.4 mm. The hole size can be selected during the production of the hole screen to suit the properties of the solution to be analysed. Due to the small holes, the fibres of the pulp solution are not able to penetrate deep into the holes, while the filtrate can be effectively directed inside the hole screen 120.

The hole size can vary within one hole screen 120. For example, the diameter of the holes closer to the first end of the piston rod 111 can be larger than the diameter of the holes closer to the second end of the piston rod 112. This way the flow through the hole screen can be balanced during the movement of the piston rod. The holes can be equal in diameter throughout the bore. The holes 123 may also be unequal so that the diameter in the outer surface of the hole screen is different than the diameter on the inside surface of the hole screen.

Figure 6:
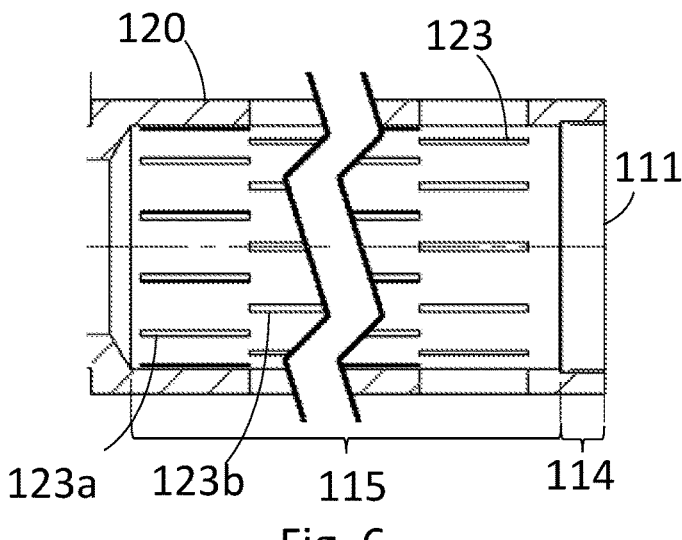
FIG. 6 shows a hole screen with elongated holes.

In FIG. 6 there is an embodiment of hole screen 120 with elongated holes.

The holes 123 of the hole screen 120 are elongated. The elongation is parallel to the piston rod 110. The length of the holes can be 1 to 5 mm. and the width of the holes 0.05 to 0.6 mm. The elongated form of the hole is advantageous for cleaning of the hole screen. When the end edge 141 brushes the hole screen using the fibre layer, the fibres within the elongated holes are easily torn out while the fibre layer moves on top of the hole screen. The elongated holes can be placed in many different ways to the hole screen. For structural strength it is beneficial to place consecutive elongated holes (123a, 123b) on different radial positions. The position of the consecutive elongated holes may also be partly overlapping in the direction of the piston rod, but apart from each other radially.

Figure 7:
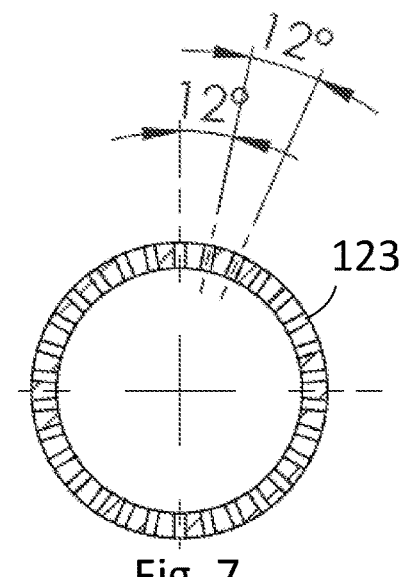
FIG. 7 shows a radial cross section of screen filter with holes.

FIG. 7 shows radial cross section of hole screen 120. The holes 123 of the hole screen 120 can be formed at equal distances on the circumference of the hole screen 120. Thus, the whole exterior surface area of the hole screen can be used for collecting the filtrate sample.

The actuator 130 can be, for example, a pneumatic actuator, such as a pneumatic cylinder. Actuator may also be an electric actuator.

The valve 14 can be connected to a pipeline to an analyser. Thus, the filtrate sample can be analysed immediately after collecting. Thereby the delay between collecting and analysing does not cause changes to the chemical properties and the sample can be analysed while it is as representative as possible. The analyser can recognize the sampling time and save the measurement results for later analyse.

The invention provides a way to take filtrate samples for long periods without need for external cleaning equipment such as an air compressor or water inlet.

The filtrate sampling device 100 can be made of e.g., stainless steel or acid resistant steel, such as AISI 316 or 254 SMO, or titanium. Stainless steel or acid resistant steel can especially be used when the filtrate sampling device is used in pulp production steps with large amounts of peroxides and oxygen present, such as bleaching. Titanium can be used in pulp production steps where chlorine and chlorine dioxide are used. This will ensure a long service life in the above-mentioned aggressive conditions as well.

The filtrate sampling device 100 can be used for collecting a filtrate sample from pulp solution for determining the chemical features of the filtrate. Chemical properties of the filtrate can be determined from the filtrate sample, such as pH, peroxide concentration or residual matter concentration.

The filtrate sample flow of the filtrate sampling device 100 can be, for example, from 50 to 1000 mL/min.

The sampling rate of the filtrate sampling device 100 can be adjusted so as to suit the process. It can be e.g., 20 to 180 seconds, such as 30 seconds. The sampling sequence can be constantly repeated to maintain a constant filtrate sample flow and to keep the holes clean.

LIST OF REFERENCE NUMBERS 14 valve
15 opening
100 filtrate sampling device
101 pipe
110 piston rod
111 first end of the piston rod
112 second end of the piston rod
114 first section of the piston rod
115 second section of the piston rod
116 third section of the piston rod
120 hole screen
123 hole
130 actuator
140 jacket
141 end edge
145 portion with smaller diameter
150 flange
160 portion with larger diameter
161 circular protrusion
162 empty space
180 ball valve
201 fibre layer

The invention claimed is:

1. A filtrate sampling device for collecting a filtrate sample from a pulp solution, the filtrate sampling device comprising:
   a jacket;
   a hollow piston rod (i) comprising a first end, a second end, and an opening, (ii) being arranged inside the jacket in a longitudinal direction of the jacket, and (iii) being arranged to reciprocate inside the jacket in the longitudinal direction of the jacket; and a hole screen arranged on the hollow piston rod, the hole screen comprising a number of holes, and the hole screen and the jacket having a clearance defined therebetween, wherein
   an end edge of the jacket is arranged to contact the hole screen as the hollow piston rod moves into the jacket, and
   the filtrate sampling device is equipped with backflush equipment comprising:
      an empty space defined between an inner wall of the jacket and the hollow piston rod, the opening of the hollow piston rod providing a path between an interior of the hollow piston rod and the empty space, such that the empty space is in fluid communication with the holes of the hole screen through the interior of the hollow piston rod and the opening, and
      a protrusion disposed around the hollow piston rod, the protrusion forming a piston that affects a volume of the empty space.

2. The filtrate sampling device according to claim 1, additionally comprising an actuator connected to the second end of the hollow piston rod and arranged to reciprocate the hollow piston rod inside the jacket in the longitudinal direction of the jacket.

3. The filtrate sampling device according to claim 1, wherein the hole screen is arranged at the first end of the hollow piston rod.

4. The filtrate sampling device according to claim 1, wherein the hollow piston rod extends to the inside of the jacket.

5. A method for collecting a filtrate sample from a pulp solution, the method comprising:
   collecting the filtrate sample from the pulp solution with the filtrate sampling device according to claim 1, and
   determining the chemical properties of the filtrate sample.

* * * * *